United States Patent [19]

Hosoe et al.

[11] Patent Number: 4,527,879
[45] Date of Patent: Jul. 9, 1985

[54] CAMERA SYSTEM

[75] Inventors: Kazuya Hosoe, Kunitachi; Takao Kinoshita, Tokyo, both of Japan

[73] Assignee: Canon Kabushiki Kaisha, Tokyo, Japan

[21] Appl. No.: 631,008

[22] Filed: Jul. 16, 1984

Related U.S. Application Data

[63] Continuation of Ser. No. 313,582, Oct. 21, 1981, abandoned.

[30] Foreign Application Priority Data

Oct. 23, 1980 [JP] Japan ................... 55-149062

[51] Int. Cl.³ ............................... G03B 3/00
[52] U.S. Cl. .................. 354/400; 354/195.1; 354/286
[58] Field of Search ............ 354/400, 406, 195.1, 354/286

[56] References Cited

U.S. PATENT DOCUMENTS

| | | | |
|---|---|---|---|
| 3,972,056 | 7/1976 | Tsujimoto et al. | 354/25 |
| 4,104,650 | 8/1978 | Hosoe et al. | 354/25 |
| 4,239,357 | 12/1980 | Iida | 354/198 |
| 4,319,813 | 3/1982 | Aoki et al. | 354/198 |
| 4,323,303 | 4/1982 | Enomoto | 354/286 |
| 4,404,595 | 9/1983 | Ushiro et al. | 354/25 |
| 4,423,941 | 1/1984 | Iwata et al. | 354/195.1 |

FOREIGN PATENT DOCUMENTS

| | | | |
|---|---|---|---|
| 3120911 | 3/1982 | Fed. Rep. of Germany | 354/286 |
| 85233 | 7/1975 | Japan . | |
| 155337 | 12/1980 | Japan | 354/195 |
| 2083639 | 3/1982 | United Kingdom | 354/197 |

Primary Examiner—Russell E. Adams
Attorney, Agent, or Firm—Fitzpatrick, Cella Harper & Scinto

[57] ABSTRACT

A camera system has a camera main body which has a focus detecting device for detecting a focusing state of a photographic optical means in a photographic lens assembly mounted, a display responsive to an output signal from the focus detecting device, and a contact for transmitting the output signal of the focus detecting device to outside of the camera main body. In this camera system, the camera main body are usable with a photographic lens assembly of first type which has an automatic focusing device which is capable of automatically focusing the photographic optical system on the basis of the output signal from the focus detecting device, and with a photographic lens assembly of second type which does not have such an automatic focusing device. When the camera main body is combined with the photographic lens assembly of first type, automatic focusing of the photographic optical system may be performed. When the camera main body is combined with the photographic lens assembly of second type, manual focusing may be performed utilizing a display at the side of the camera main body for displaying the focusing state.

21 Claims, 24 Drawing Figures

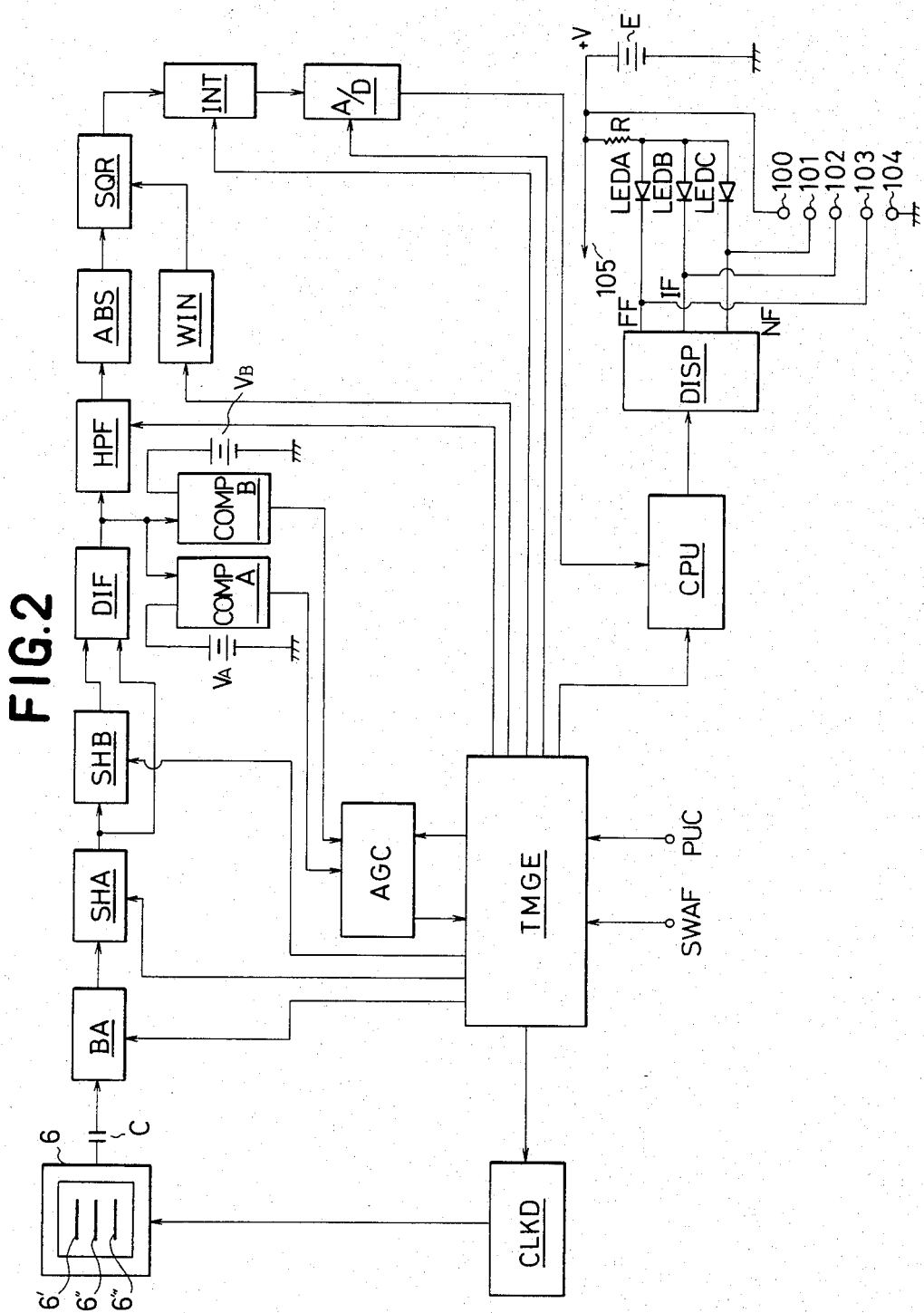

FIG.3
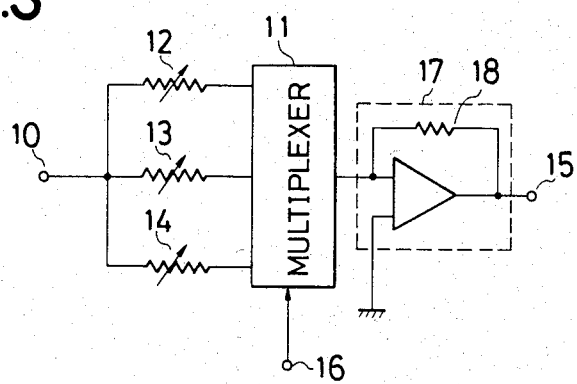
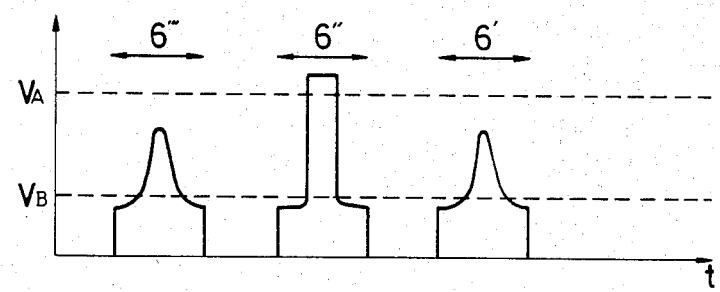
FIG.4 A
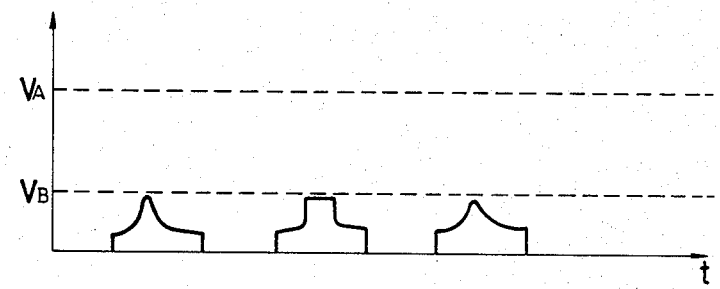
FIG.4 B
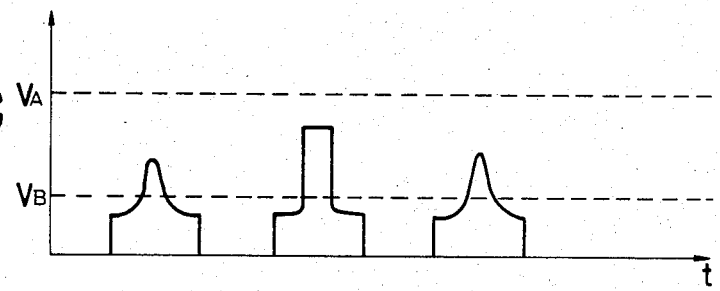
FIG.4 C

CAMERA SYSTEM

This application is a continuation of application Ser. No. 313,582, filed Oct. 21, 1981, now abandoned.

BACKGROUND OF THE INVENTION

1. Field of the Invention

The present invention relates to a camera system including a camera main body and an interchangeable photographic lens assembly and, more particularly, to focusing therefor.

2. Description of the Prior Art

Since the photographic lens assemblies are interchangeable in a single reflex camera system, various limits are imposed for automatic focusing.

The seemingly easiest means for automatic focusing in a single reflex camera system with which the lenses may be interchanged is to include all the functions necessary for automatic focusing in the photographic lens assembly, that is, to include all the elements, in the photographic lens assembly, which may be required for detection of the focusing state of the photographic optical system and automatic focusing of the optical system based on the detection result. However, with this method, the lens assembly becomes complex in construction, bulky in size and expensive to manufacture.

It has also been proposed, considering the importance of universality for all the interchange lens assemblies, to include a unit in the camera main body which detects the focusing state of the photographic optical system and displays the detected result. With this method, it is indeed possible to perform focusing utilizing the focus display for all the interchangeable lens assemblies. However, it is impossible to accomplish automatic focusing, resulting in inconvenience.

SUMMARY OF THE INVENTION

The present invention has been made in consideration of this, and has for its primary object to provide a camera system including a camera main body and interchangeable photographic lens assemblies, wherein the drawbacks of conventional camera systems are eliminated and focusing may be performed with efficiency.

It is another object of the present invention to provide a camera system with which the manual focusing mode utilizing a display means and the automatic focusing mode may be freely selected.

In order to achieve the above objects, there is provided according to the present invention a camera system comprising a camera main body having a focus detecting device which detects a focusing state of a photographic optical system in a photographic lens assembly mount, a display means responsive to an output of the focus detecting device, and a terminal for transmitting the output of the focus detecting device to an external device; a photographic lens assembly of first type with an automatic control device for automatic focusing of the photographic optical system in accordance with the output of the focus detecting device; and a photographic lens assembly of second type without such an automatic control device, wherein, when the camera main body and the photographic lens assembly of first type are combined, the focusing of the photographic optical system may be automatically performed and, when the camera main body and the photographic lens assembly of second type are combined, the manual focusing of the photographic optical system may be performed utilizing the display means for displaying the focusing state at the camera main body.

According to the camera system of the construction as described above, when the lens assembly of second type is used, the camera system may be used as a camera having focus indicator. When the lens assembly of first type, that is, the power focus lens assembly is used, the camera system may be utilized as an automatic focus camera system. The power focus lens assembly essentially requires a drive means for driving the optical system. However, the drive means for the focus indicator camera may be simplified as compared to that for the automatic focus lens assembly. If several power focus lens assemblies of such construction are prepared, the user may selectively use the normal lens assembly and the power focus lens assembly as needed, resulting in convenient photography. According to the preferred embodiment of the present invention to be described hereinafter, the power from the power source included at the camera main body may be supplied to the power focus lens assembly, so that no power source is required for the power focus lens assembly at the lens assembly side. All the operations for focusing may be performed at the control section of the camera main body. This construction is advantageous in ease in use and weight balance over the automatic focus lens assemblies which have the control section, the power source, and the power source switch at the lens assembly side. It is to be noted, with the construction according to the embodiment of the present invention, the power source in the camera main body may be utilized as the power source for the automatic exposure, automatic winding and so on.

Other objects and features of the present invention will become apparent from the following description when taken in conjunction with the accompanying drawings.

BRIEF DESCRIPTION OF THE DRAWINGS

The preferred embodiments of the present invention will now be described with reference to the accompanying drawings, in which:

FIGS. 1A to 1C are model views for explaining the principle of focus detection operation of an example of a focus detecting system which may be applied to a camera system of the present invention, wherein FIG. 1A shows the optical arrangement of the focus detecting system, FIG. 1B shows the configuration of light-receiving sections of a photoelectric transducer element shown in FIG. 1A, and FIG. 1C shows changes in sharpness of the image at three points in FIG. 1A;

FIG. 2 is a block diagram showing the configuration of electric circuitry of a focus detecting system according to the principle shown in FIGS. 1A to 1C and according to one embodiment of the camera system of the present invention;

FIG. 3 is a partial circuit diagram showing an example of a balance adjusting circuit shown in the circuitry of FIG. 2;

FIGS. 4A to 4C show signal waveforms for explaining the function of a window comparator shown in FIG. 2, which discriminates if the accumulating time is appropriate;

FIGS. 11A and 11B are views showing the outer appearance of the single reflex camera system shown in FIG. 10 wherein FIG. 11A is a front view and FIG. 11B is a bottom view;

FIGS. 12A and 12B are views showing examples of power focus lens assemblies which may be used with the camera system shown in FIGS. 11A and 11B, wherein FIG. 12A is a sectional view and FIG. 12B is a rear view.

DETAILED DESCRIPTION OF THE PREFERRED EMBODIMENTS

Figure 1A:
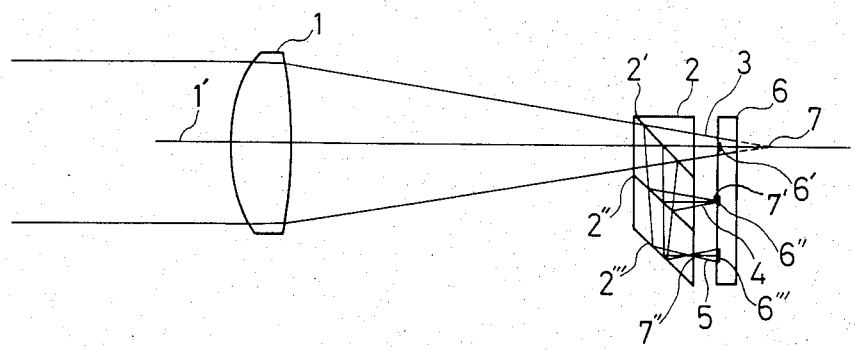

Referring to FIG. 1A, an imaging lens 1 has an optical axis 1'. A beam splitter 2 is arranged in the optical path of the imaging lens 1 and has semi-transmittal sections 2' and 2" and a total reflection section 2'''. Light emerging from the imaging lens 1 becomes incident on the semi-transmittal section 2', and is then divided by the semi-transmittal section 2" and the total reflection section 2''' into three separate light rays 3, 4 and 5. If the semi-transmittal section 2' transmits about one third of the incident light and reflects the remaining two thirds, and the semi-transmittal section 2" transmits about half of the incident light and reflects the remaining half of the incident light, it is apparent that the energy for the three divided light rays 3, 4 and 5 becomes substantially the same. A photoelectric transducer 6 has three light-receiving sections 6', 6" and 6'''.

If the convergent point of the light ray 3 is at point 7, it is easily seen that the convergent points of the divided light rays 4 and 5 are at points 7' and 7", respectively. If the convergent point 7' of the light ray 4 which is reflected and divided by the semi-transmittal sections 2' and 2" coincides with the light-receiving section 6", the convergent point 7 of the light ray 3 incident on the light-receiving section 6' is located behind the light-receiving section 6', and the convergent point 7" of the light ray 5 incident on the light-receiving section 6''' is located in front of the light-receiving section 6'''. The deviations of these converging points from the light-receiving sections become the same if the distances between the semi-transmittal sections 2' and 2" and between 2" and the total reflection section 2''' are equal to each other. As a result, the sharpness of the image on the light-receiving section 6" becomes maximum, and the sharpnesses of the images on the light-receiving sections 6' and 6''' become low but are similar to each other.

Figure 1B:
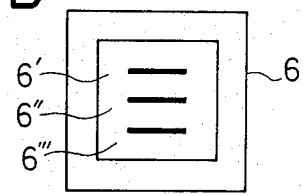
Figure 1C:
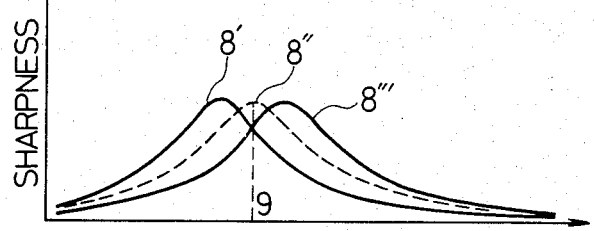

If the imaging lens 1 is displaced along the optical axis 1', the sharpnesses of the images on the light-receiving sections 6', 6" and 6''' change as shown in FIG. 1C. Curves 8', 8" and 8''' representing changes in the sharpnesses of the images on the light-receiving sections 6', 6" and 6''' form peaks in FIG. 1C, wherein the displacement of the imaging lens 1 is plotted as the abscissa and the sharpness is plotted as the ordinate. The condition shown in FIG. 1A corresponds to point 9 shown in FIG. 1C. If the light-receiving surface of the light-receiving section 6" of the photoelectric transducer 6 is arranged to substantially coincide with the predetermined focal plane (the film surface in the case of a camera) of the imaging lens 1, it is detected that the imaging lens 1 is in the in-focus state under the condition shown in FIG. 1A, that is, when the relationships between the sharpnesses of the images on the respective light-receiving sections 6', 6" and 6''' are represented by the point 9 in FIG. 1C. Then, it is apparent from FIG. 1C that the relationships between the sharpnesses 8' and 8''' are inverted according to whether the imaging plane surface of the lens 1 is in front of or behind the light-receiving section 6". In this manner, the near-focus state and the far-focus state can be detected.

FIG. 1B is a front view of the photoelectric transducer 6 wherein the respective light-receiving sections 6', 6" and 6''' comprise, for example, belt-shaped linear CCDs. However, the shape of the light-receiving sections is not necessarily limited to this shape.

A focus detecting system is thus obtained which has the beam splitter 2 and the photoelectric transducer 6 with the three light-receiving sections 6', 6" 6''' . FIG. 2 shows a block diagram of an electric circuit which reads image signals from the light-receiving sections 6', 6" and 6''', extracts sharpness signals, and discriminates the magnitudes of sharpness of the image at three points. Many of the blocks shown in FIG. 2 are of known configuration and details of them are shown in a series of applications as in U.S. patent application Ser. No. 59,635, "Focus Detecting System", Kinoshita et al, filed on July 23, 1979 (corresponding German DOLS No. 29 30 636), U.S. patent application Ser. No. 151,703, "Image Sharpness Detecting System", Kawabata et al, filed on May 20 , 1980 (corresponding German Patent Application No. P 30 19 908.7), and so on. Therefore, only parts which are essentially related to the present invention will be described.

Referring to FIG. 2, the photoelectric transducer 6 shown in FIG. 1 comprises a CCD having the three light-receiving sections 6', 6" and 6'''. A series of clock signals for operating the CCD 6 are supplied from a clock driver CLKD. These clock signals are supplied to initiate a series of operations of the CCD 6 such as integration, transfer, resetting and so on in a predetermined order. The charge stored for a predetermined period of time in the CCD 6 is charge-voltage converted at the output of the CCD 6 and is thereafter input, as an image signal, to a balance adjusting circuit BA through a capacitor C for suppressing noise. These image signals corresponding to the three light-receiving sections 6', 6" and 6''' of the CCD 6 are time-serially read out in an order which is determined by the configuration of the CCD 6.

The balance adjusting circuit BA, as shown in FIG. 3, has a multiplexer 11 of known configuration and three variable resistors 12, 13 and 14. Referring to FIG. 3, the image signal as described above is supplied to the multiplexer 11 through the variable resistors 12, 13 and 14. In response to a synchronizing signal received from a terminal 16, the multiplexer 11 receives the image signals corresponding to the respective light-receiving sections 6', 6" and 6''' through the variable resistors 12, 13 and 14, respectively, and outputs them to an amplifier 17.

The variable resistors 12, 13 and 14 control the balance of the image signals from the light-receiving sections 6', 6" and 6'". The outputs from the resistors 12, 13 and 14 are input through the multiplexer 11 to the amplifier 17 where the gains of the respective images are controlled according to their ratios by a feeding resistor 18 and then are input to the next electric circuit. Balance adjustment of the image signals is useful when there is an imbalance in the three light rays 3, 4 and 5 divided by the beam splitter 2. The synchronizing signal is supplied at the terminal 16 from a timing generator TMGE. Although three variable resistors are used in this embodiment, two variable resistors may be used to balance two image signals in relation to the remaining image signal.

Signal processing in this circuitry must be performed according to a series of synchronizing signals which are supplied from the timing generator TMGE. In response to an operation command signal SWAF of the circuitry (a signal generated in synchronism with the depression of a shutter release button to the first position in the case of a camera) and a power clear signal PUC, the timing generator TMGE generates the various synchronizing signals to the respective blocks in the circuitry in a predetermined order. The timing generator TMGE may be of known configuration and need only generate the group of synchronizing signals suitable for the operation of the circuitry of this embodiment. The clock driver CLKD also operates in response to the timing generator TMGE.

The image signals adjusted by the balance adjusting circuit BA are input to a first sampling and holding circuit SHA. The first sampling and holding circuit SHA shapes the image signals from the CCD 6. In response to a sampling pulse from the timing generator TMGE synchronous with the output of the image signals from the CCD 6, the first sampling and holding circuit SHA samples and holds the level of the respective image signals.

The temperature and accumulating time of the CCD are influenced by the dark current since the actual CCD comprises a semiconductor. Therefore, the actual image signal includes the dark current level superposed on the signal corresponding to the actual amount of incident light. Thus, the image signal contains a noise component. Part of the light-receiving section of the CCD is masked with an aluminum mask or the like, and a signal output from this part is considered to be the dark current level. Then, the difference is obtained between the output from the unmasked light-receiving section and the output of the masked part (to be referred to as a dark current bit hereinafter), that is, the dark current level, to thereby remove the influence of the dark current. The dark current bit (not shown) is included at the end of each of the light-receiving sections 6', 6" and 6'" of the CCD 6, so that this bit is output first. A second sampling and holding circuit SHB samples and holds the output level of these dark current bits. The second sampling and holding circuit SHB receives commands from the timing generator TMGE for holding the output level. A differential amplifier DIF receives the output signal from the sampling and holding circuit SHA and the output signal from the sampling and holding circuit SHB for taking the difference between these two inputs. The image signals obtained as the output of the differential amplifier DIF are signals whose dark current level is cancelled and which correctly correspond to the amount of incident light.

The output of the differential amplifier DIF is input to a high-pass filter HPF and to two comparators COMPA and COMPB. A reference voltage VA is supplied to the comparator COMPA and a reference voltage VB is supplied to the comparator COMPB. These comparators COMPA and COMPB constitute a window comparator.

The mode of operation of the window comparator will now be described with reference to FIGS. 4A–4C. FIGS. 4A, 4B and 4C show the relationship between the peak value of the image signal compensated for the dark current level (to be referred to as the dark current-compensated image signal hereinafter) and the reference voltages VA and VB, the time being plotted as the abscissa and the voltage being plotted as the ordinate. The ranges in FIG. 4A indicated by arrows at 6'", 6" and 6' represent the timings with which the image signals are output from the light-receiving sections 6'", 6" and 6', respectively. In FIG. 4A, part of the dark current-compensated signal (part of 6") exceeds the reference voltages VA and VB, and the signal level is too high. In this case, the outputs of both the comparators COMPA and COMPB are at high level. In FIG. 4B, the dark current-compensated signal is lower than the reference voltage VB and the signal level is too low. In this case, the outputs of both the comparators COMPA and COMPB are at low level. In FIG. 4C, the peak value of the dark current-compensated signal is between the reference voltages VA and VB and is at a suitable level. In this case, only the output of the comparator COMPB is at high level, and the output of the comparator COMPA is at low level. If the reference voltages VA and VB are so selected to set the suitable level of the dark current-compensated signal, the combination of the high or low level of the outputs of the comparators COMPA and COMPB indicates the appropriateness of the dark current-compensated signal level. If VA > VB in this embodiment, when the outputs of both the comparators COMPA and COMPB are at high level, it indicates that the dark current-compensated signal is at too high a level including saturated level. When the outputs of both the comparators COMPA and COMPB are at low level, it indicates that the dark current-compensated signal level is too low. Only when the output of the comparator COMPA is at low level and the output of the comparator COMPB is at high level, does it indicate that the dark current-compensated signal is at a suitable level.

The outputs of the comparators COMPA and COMPB are supplied to a accumulating time control circuit AGC for maintaining the appropriate dark current-compensated signal level by shortening the accumulating time of the CCD 6 when it is too high and by prolonging the accumulating time when it is too low. In response to a synchronizing signal from the timing generator TMGE, the integrating time control circuit AGC operates so that it may be able to discriminate the state of the outputs of the comparators COMPA and COMPB at the timing at which the dark current-compensated signals are output from the light-receiving sections 6', 6" and 6'". Based on the output state of the comparators COMPA and COMPB, the accumulating time control circuit AGC outputs a command signal to shorten or prolong the accumulating time to the timing generator TMGE. In response to the command signal, the timing generator TMGE so operates the clock driver CLKD that the accumulating time of the CCD 6 may be shortened or prolonged at the next output from the CCD 6.

The high-pass filter HPF evaluates the degree of change in the image. The high-pass filter extracts the high frequency components from the image signal as a first step in evaluating the sharpness of the image. The timing generator TMGE supplies to the high-pass filter HPF a synchronizing signal which is synchronous with the timing at which the image signals corresponding to the light-receiving sections 6', 6" and 6'" of the CCD 6 are input. This is to prevent the generation of an output from the light-pass filter HPF which is independent of the sharpness of the image and which is caused by an abrupt change in the signal at the initial period. This synchronizing signal temporarily resets the high-pass filter HPF.

The output of the high-pass filter HPF is supplied to a squaring circuit SQR through an absolute value circuit ABS. The absolute value circuit ABS takes the absolute value of the output from the high-pass filter HPF. Since there may be both a positive and a negative change in the image signal (dark to bright and bright to dark), if the output of the high-pass filter HPF were directly supplied to an integrating circuit INT to be described later, the outputs may cancel each other and the signal representing the sharpness of the image might become zero depending upon the image pattern. The absolute value circuit ABS is incorporated to prevent this. The squaring circuit SQR may utilize, for example, nonlinear input/output characteristics of a semiconductor. The function of the squaring circuit SQR in this circuitry is to emphasize and evaluate the peak output of the high-pass filter HPF, that is, the state wherein the change of the image signal with time is great and the sharpness is high. The squaring circuit SQR incorporates a window function generating circuit WIN. This is to prevent, by lowering the weight for evaluation of the sharpness of the image near the edge of the field of view, the introduction of errors in the normal evaluation of the sharpness when an image outside the field of view enters inside the field of view as part of the out-of-focus image. This is also to prevent the introduction of transient error when another image enters the field of view due to blurring of the image formed by the imaging lens 1. The output of the window function generating circuit WIN controls the gain of the squaring circuit SQR so that it may become low at the edge of the field of view and become high at the center. Thus, in response to the timing signal from the timing generator TMGE synchronous with the initiation of operation of the light-receiving sections 6', 6" and 6'" of the CCD 6, the window function generating circuit WIN controls the gain of the squaring circuit according to the relationship determined in correspondence with the location (location in the field of view).

The output of the squaring circuit SQR including the emphasized sharpness data is input to the integrating circuit INT which performs integration for the entire area of the light-receiving sections and outputs the sharpness of the image at each of the light-receiving sections. A synchronizing signal is also supplied from the timing generator TMGE to the integrating circuit INT so that integration and integration resetting may be performed at the timings corresponding to the light-receiving sections 6', 6" and 6'". In this manner, the output of the integrating circuit INT corresponds to the electric output such as the sharpness of the respective images corresponding to the order of output from the light-receiving sections 6', 6" and 6'" of the CCD 6.

The analog output of the integrating circuit INT is input to an A-D converting circuit A/D for conversion into a digital value so that the signal processing may be facilitated for discrimination at a central processing unit CPU of an in-focus state, a near-focus state, and a far-focus state of the imaging lens 1.

FIGS. 5A–5F show the output waveforms of the respective blocks of the circuitry in order to clarify the analog processing of the series of signals representing the sharpness of the image, starting from the read-out of the image signals from the light-receiving sections 6', 6" and 6'" of the CCD 6 (the field of view for the three images) until the integration at the integrating circuit INT. In FIGS. 5A–5F, time is plotted as the abscissa and the voltage or current output is plotted as the ordinate in arbitrary units. The ranges indicated at arrows 6', 6" and 6'" in FIG. 5 represent the timings with which the signals corresponding to the light-receiving sections 6', 6" and 6'" of the CCD 6 are output and processed. The state of the respective images corresponds to the in-focus state of the imaging lens 1 in which the sharpness of the image of the light-receiving section 6" is highest, that is, the sharpness as shown at 9 in FIG. 1C is highest. FIG. 5 shows the state of the signal output from the CCD 6 only once, but these signals are repeatedly output in practice.

Figure 5A:
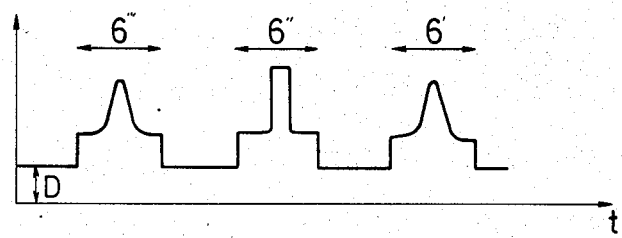
FIGS. 5A to 5F show output waveforms of the outputs of the main blocks of the circuitry shown in FIG. 2.
Figure 5B:
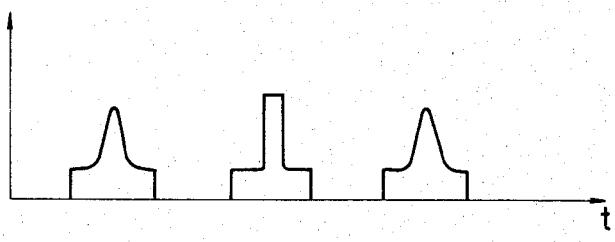
Figure 5C:
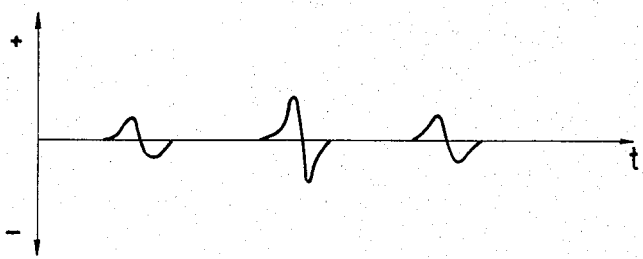
Figure 5D:
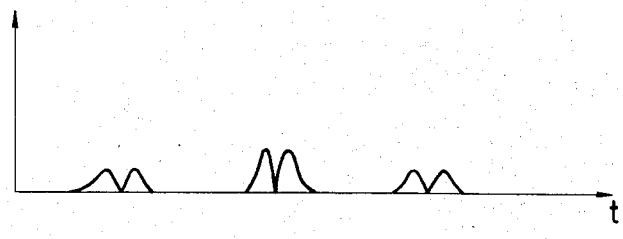
Figure 5E:
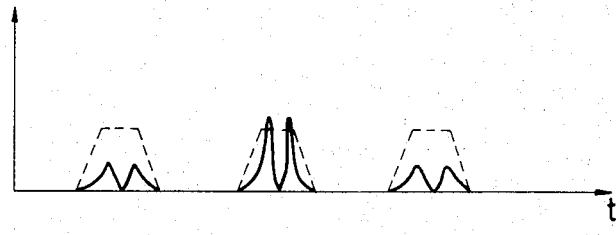
Figure 5F:
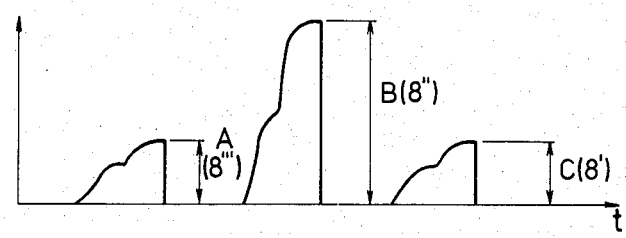

FIG. 5A shows the image signal which is output from the CCD 6 and has passed through the sampling and holding circuit SHA. The order for output of the images from the light-receiving sections is 6'", 6" and 6'. The voltage indicated by letter D is the dark current level, which is first output and is held by the sampling and holding circuit SHB. FIG. 5B shows the output of the differential amplifier DIF, that is, the dark current-compensated signal in which the dark current level D is cancelled. FIG. 5C shows the output of the high-pass filter HPF. FIG. 5D shows the output of the absolute value circuit ABS. FIG. 5E shows the output of the squaring circuit SQR, wherein the trapezoids indicated by the broken lines show the manner in which the gain of the squaring circuit SQR changes within the field of view according to the shape of the window generated by the window function generating circuit WIN described above. FIG. 5F shows the output of the integrating circuit INT wherein levels A(8'"), B(8") and C(8') correspond to the sharpnesses of the images on the light-receiving sections 6'", 6" and 6', respectively. Specifically, A, B and C in FIG. 5F correspond to the levels of the curves 8'", 8" and 8' of FIG. 1C at the point 9.

The levels A, B and C are converted into digital data by the A-D converting circuit A/D described above and are input to the central processing circuit CPU. The CPU computes the relationships among the levels A, B and C according to the conditions of the in-focus state, the near-focus state, the far-focus state, and the interruption of the discrimination which are set in advance. Basically, in the in-focus state, conditions $B>A$, $B>C$ and $A=C$ are satisfied. In the near-focus state, condition $C>A$ is satisfied, and in the far-focus state, condition $A>C$ is satisfied. The CPU discriminates which set of conditions is satisfied and outputs a signal corresponding to one of these three states. As the algorithm for the discrimination at the CPU may be adopted the algorithm as disclosed in U.S. patent application Ser. No. 151,533, "Focus Detecting System", Sakai et al, filed on May 19, 1980 (corresponding German Patent Application No. P 30 19 901.0) of the same assignee or in the U.S. patent application which is to be filed on Oct. 16, 1981 by Shinji Sakai, Nobuhiko Shinoda, Takao Kinoshita, Kazuya Hosoe and Takashi Kawabata (corresponding Japanese Patent application No. 144,782/1980).

The output of the central processing circuit CPU is input to the display circuit DISP. The display circuit DISP basically comprises a logic circuit and a drive circuit for driving indicators such as LEDs. In accordance with the commands from the central processing circuit CPU, in this embodiment, the display circuit DISP lights up the light-emitting diode LEDB in the case of in-focus state, and lights up the light-emitting diodes LEDC and LEDA, respectively, in the cases of near-focus and far-focus states to indicate that the imaging lens 1 is in the in-focus, near-focus or far-focus state. A protective resistor R is incorporated to protect the LEDA to LEDC when a voltage V is supplied to them. Although LEDs are used in this embodiment, liquid crystal display devices, electrochromies or the like may be used.

A power source E is incorporated in the camera main body and supplies power to the respective circuit parts. The power is supplied from the power source E to the respective circuit parts in the direction indicated by arrow 105. Contacts 100 to 104 transmit signals and power to the outside of the camera main body as will be described later.

The configuration of the timing generator TMGE will be described with reference to FIGS. 6 and 7.

Figure 6:
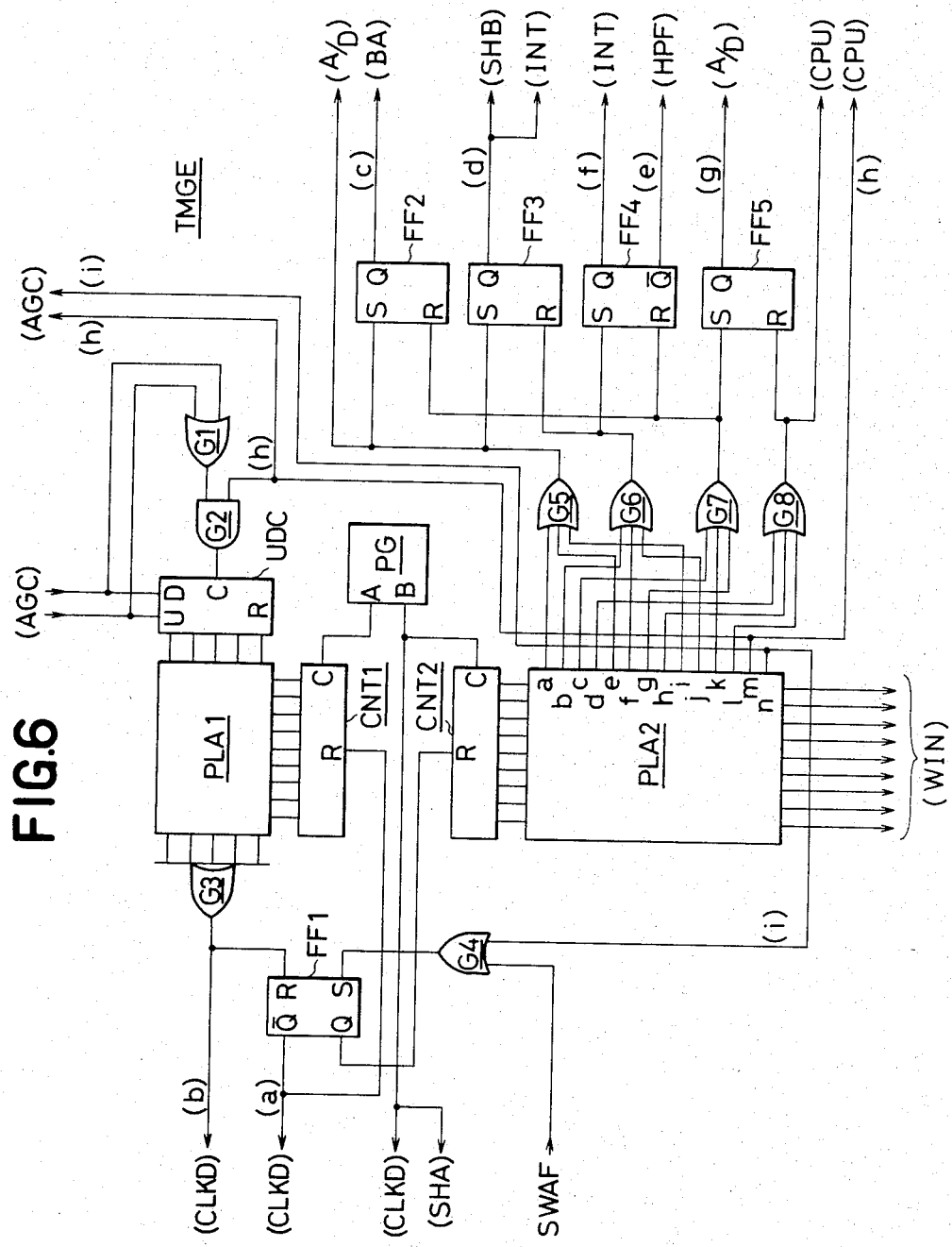
FIG. 6 is a block diagram showing the configuration of a timing generator in the circuitry shown in FIG. 2.
Figure 7:
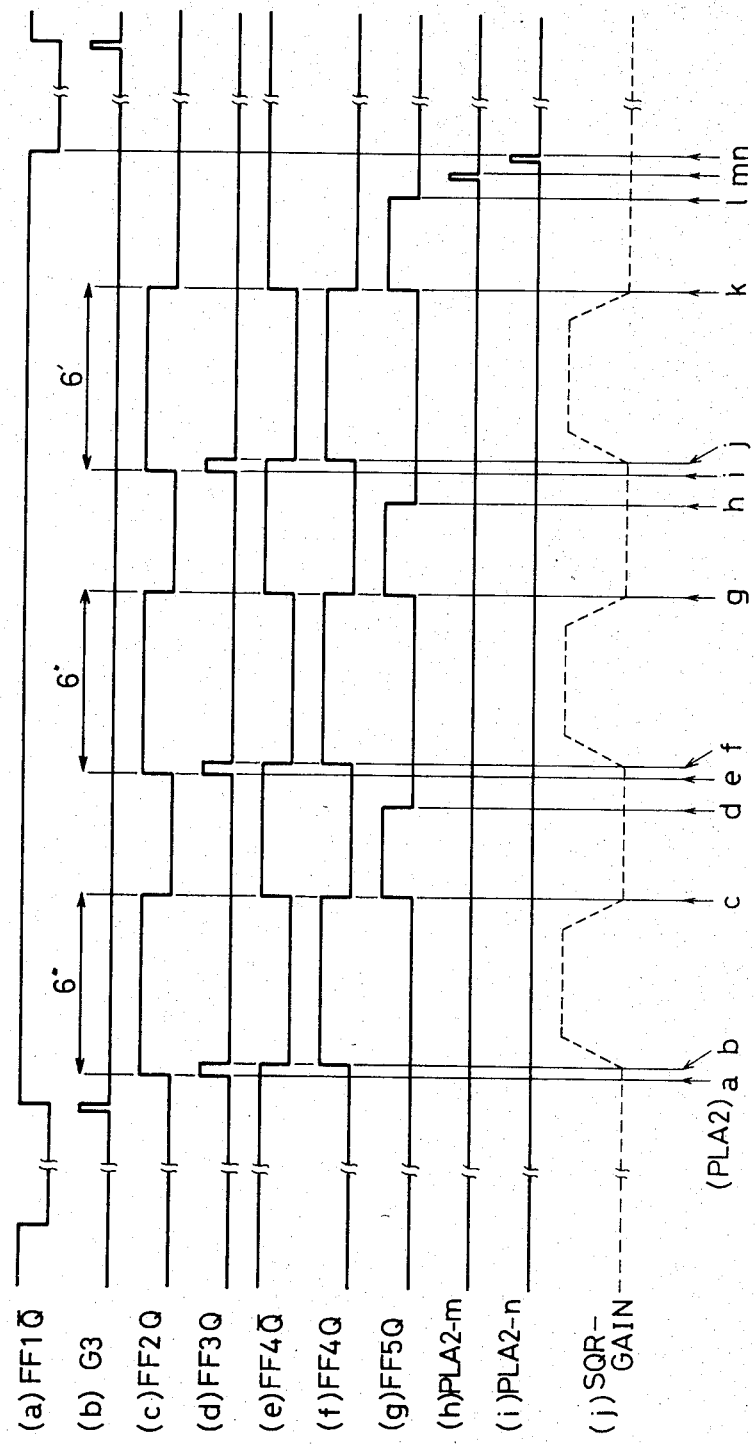
FIG. 7 is a timing chart showing timing signals for controlling various operations which are output from the timing generator shown in FIG. 6.

Referring to FIG. 6, the part of the circuitry consisting of an up/down counter UDC, a counter CNT1, a programmable logic array PLA1 AND gate G2 and OR gates G1 and G3 mainly serve to regulate the accumulating time of the CCD 6. The up/down counter UDC is set in the up-counting mode in response to an accumulating time shortening command from the accumulating time control circuit AGC and is set in the down-counting mode in response to an accumulating time prolonging command therefrom. The up/down counter UDC is so controlled to count one pulse at a predetermined timing to be described later to set a different accumulating time only if an accumulating time change command is output from the accumulating time control circuit AGC. The CNT1 counts a pulse train A from a pulse generator PG. When the count of the counter CNT1 reaches a predetermined value which is set by the output of the up/down counter UDC, the programmable logic array PLA1 generates a timing pulse which is output through the OR gate G3. The output of the OR gate G3 is supplied to the clock driver CLKD, in response to which the clock driver CLKD generates a start pulse (shift pulse) for initiating the output of the signals from the CCD6. The start pulse is supplied to the CCD 6. The output waveform of the OR gate G3 is as shown in FIG. 7(b).

An RS flip-flop FF1 generates a control signal to the clock driver CLKD to normally set the CCD 6 in the clear condition and to release the clear condition only during the period in which signal integration is required. The RS flip-flop FF1 is set by the operation command signal SWAF described above which is supplied through an OR gate G4 or a pulse signal for repetition of the operation which is generated at a predetermined timing to be described later. The RS flip-flop FF1 is reset by the output of the OR gate G3. The $\overline{Q}$ output of the RS flip-flop FF1 as shown in FIG. 7(a) is supplied as a control signal to the clock driver CLKD. The CCD 6 has an overflow drain gate which is opened or closed according to the $\overline{Q}$ output of the RS flip-flop FF1 (the gate is opened when the $\overline{Q}$ output is at high level and is closed when it is at low level) to thereby control the integration of the signal charge by the CCD 6. The interval shown in FIG. 7(a) in which the $\overline{Q}$ output of the RS flip-flop FF1 is at low level corresponds to the accumulating time of the signal charge, which is defined as an interval from the predetermined timing of setting the RS flip-flop FF1 to the generation of the pulse from the OR gate G3. Since the timing at which the pulse is generated from the OR gate G3 is regulated by the output from the up/down counter UDC, the accumulating time of the signal charge of the CCD 6 is regulated by the output of the up/down counter UDC. The $\overline{Q}$ output of the RS flip-flop FF1 is supplied to the counter CNT1 as a reset signal. Therefore, the counter CNT1 performs counting only during the interval in which the $\overline{Q}$ output of the flip-flop FF1 is at low level and is kept reset in other conditions.

The circuitry part consisting of a counter CNT2, a programmable logic array PLA2, OR gates G5 to G8, and RS flip-flops FF2 to FF5 mainly serves to control the respective parts and the overall sequence of the circuit shown in FIG. 2. The counter CNT2 counts a pulse train B from the pulse generator PG. In this embodiment, the CCD 6 is of single-phase driven type. The pulse train B is also supplied to the clock driver CLKD which generates from the pulse train B a drive clock pulse (transfer clock pulse) to be supplied to the CCD 6. The count of the counter CNT2 and the drive (transfer of the charge) are in one-to-one correspondence. The pulse train B is also supplied to the sampling and holding circuit SHA as the sampling pulse. The content of the programmable logic array PLA2 is so programmed that, based on the count output from the counter CNT2, pulses are generated from terminals a to n at the respective timings shown in FIGS. 7(a) to 7(n) after the pulse is generated from the OR gate G3. In response to the outputs from the terminals a, e and i of the programmable logic array PLA2, the OR gate G5 produces an output which is supplied to the set terminals of the RS flip-flops FF2 and FF3. In response to the outputs from the terminals b, f and j of the programmable logic array PLA2, the OR gate G6 produces an output which is supplied to the reset terminal of the RS flip-flop FF3 and the set terminal of the RS flip-flop FF4. In response to the outputs from the terminals c, g and k of the programmable logic array PLA2, the OR gate G7 produces an output which is supplied to the reset terminals of the RS flip-flops FF2 and FF4 and to the set terminal of the RS flip-flop FF5. In response to the outputs from the terminals d, h and l of the programmable logic array PLA2, the OR gate G8 produces an output which is supplied to the reset terminal of the RS flip-flop FF5. The Q outputs of the RS flip-flops FF2 to FF5 and the $\overline{Q}$ output of the RS flip-flop FF4 are shown in FIGS. 7(c) to 7(g) as contrasted with the timings (shown in FIG. 7(b)) at which the signals are output from the respective light-receiving sections 6''', 6'' and 6' of the CCD 6. The Q output (FIG. 7(c)) of the RS flip-flop FF2 is supplied to the balance adjusting circuit BA. The high level interval of the Q output (FIG. 7(d)) of the RS flip-flop FF3 corresponds to the dark current bit at the end of each of the outputs of the light-receiving sections 6''', 6'' and 6', and is supplied to the sampling and holding circuit SHB as a sampling pulse. The Q output of the RS flip-flop FF3 is also supplied to the integrating circuit INT as a reset signal. The low level interval of the $\overline{Q}$ output (FIG. 7(e)) of the RS flip-flop FF4 corresponds to the effective image signal bit of the outputs of each of the light-receiving sections 6''', 6'' and 6', and is supplied to the high-pass filter HPF as a reset signal. In this manner, the high-pass filter HPF is released from the reset condition only during the low level interval of the $\overline{Q}$ output of the RS flip-flop FF4. The Q output (FIG. 7(f)) of the RS flip-flop FF4 is supplied to the integrating circuit INT as an integration command signal. The Q output (FIG. 7(g)) of the RS flip-flop FF5 is supplied to the A-D converting circuit A/D as an A-D conversion command. The output of the OR gate G5 is supplied to the A-D converting circuit A-D as a reset signal. The output of the OR gate G8 is supplied to the central processing circuit CPU as a strobe pulse for storing the output from the A-D converting circuit A/D. The output (FIG. 7(h)) from the terminal m of the programmable logic array PLA2 is supplied to the AND gate G2 as a count pulse of the up/down counter UDC as well as to the accumulating time control circuit AGC and the central processing unit CPU as a latch pulse for latching the outputs thereof. The output (FIG. 7(i)) from the terminal n of the programmable logic array PLA2 is supplied to the OR gate G4 as a set signal of the RS flip-flop FF1 as well as to the accumulating time control circuit AGC as a reset signal for the flip-flop therein. The Q output of these flip-flop FF1 (the inverted signal of the $\overline{Q}$ output shown in FIG. 7(a)) is supplied to the counter CNT2 as a reset signal. If the counter CNT1 is in the count-enabling mode, the counter CNT2 is placed under the reset condition. If the counter CNT1 is under the reset condition, the counter CNT2 is set in the count-enabling mode. The count of the counter CNT2 is output to the window function generating circuit WIN. In response to the count output from the counter CNT2, the window function generating circuit WIN performs gain control so that the gain of the squaring circuit SQR changes as shown in FIG. 7(j). The window function generating circuit WIN may be of the configuration as disclosed in U.S. patent application Ser. No. 151,703, filed on May 20, 1980 by Kawabata et al (corresponding German Patent Application No. P 30 19 908.7) of the assignee of the present invention.

Figure 8:
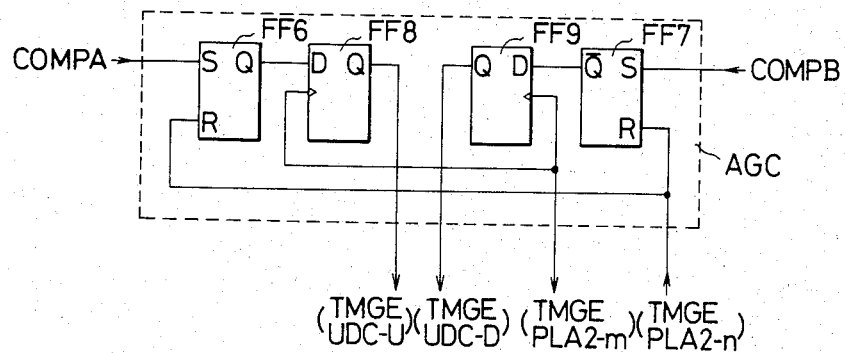
FIG. 8 is a block diagram showing the configuration of the accumulating time control circuit in the circuitry shown in FIG. 2.

Describing next the configuration of the accumulating time control circuit AGC, referring to FIG. 8, an RS flip-flop FF6 is set by an output of high level of the comparator COMPA, and an RS flip-flop FF7 is set by an output of high level of the comparator COMPB. Both of these RS flip-flops FF6 and FF7 are reset by an output (FIG. 7(i)) of high level from the terminal n of the programmable logic array PLA2 in the timing generator TMGE shown in FIG. 6. In response to an output (FIG. 7(h)) of high level from the terminal m of the programmable logic array PLA2 in the timing generator TMGE, a D flip-flop FF8 latches the Q output of the RS flip-flop FF6, and a D flip-flop FF9 latches the $\overline{Q}$ output of the RS flip-flop FF7. A high level of the Q output from the D flip-flop FF8 represents the shortening of the accumulating time, and a high level of the Q output of the D flip-flop FF9 represents the prolongation of the accumulating time. These outputs are supplied to count mode setting terminals U and D of the up/down counter UDC in the timing generator TMGE shown in FIG. 6.

Figure 9:
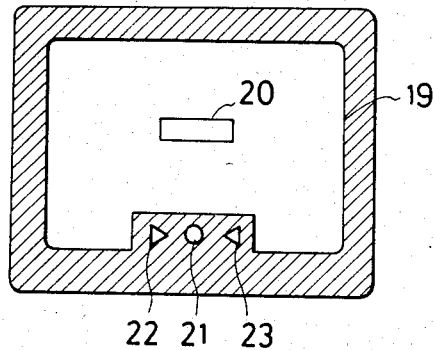
FIG. 9 is a view showing an example of a display of an output in a range finder of the focus detecting system according to the present invention.

FIG. 9 shows a preferred example of focus detection display suitable for focusing of the photographic optical system when the focus detecting system is incorporated in the camera main body, which involves a range finder field frame 19 of the camera, a field mark 20 representing the location of the field of view, and a mark 21 representing the in-focus state of the photographic optical system. The light-emitting diode LEDB shown in FIG. 2 is arranged immediately behind the mark 21. Arrow marks 22 and 23 (arrows represent the direction of rotation of a distance dial of the photographic lens for relocating it from the out-of-focus position to the in-focus position) represent the near-focus state and the far-focus state, respectively. The light-emitting diodes LEDC and LEDA shown in FIG. 2 are arranged immediately behind the arrow marks 22 and 23, respectively. In this manner, the operator is capable of confirming the focusing state of the photographic optical system simply by observing which one of these marks is lit. If the mark 21 representing the in-focus state is lit, the focusing operation is interrupted. If the arrow mark 22 or 23 is lit, the distance dial need only be rotated in the direction indicated by the arrow mark 22 or 23, respectively, until the in-focus mark 21 is lit.

Figure 10:
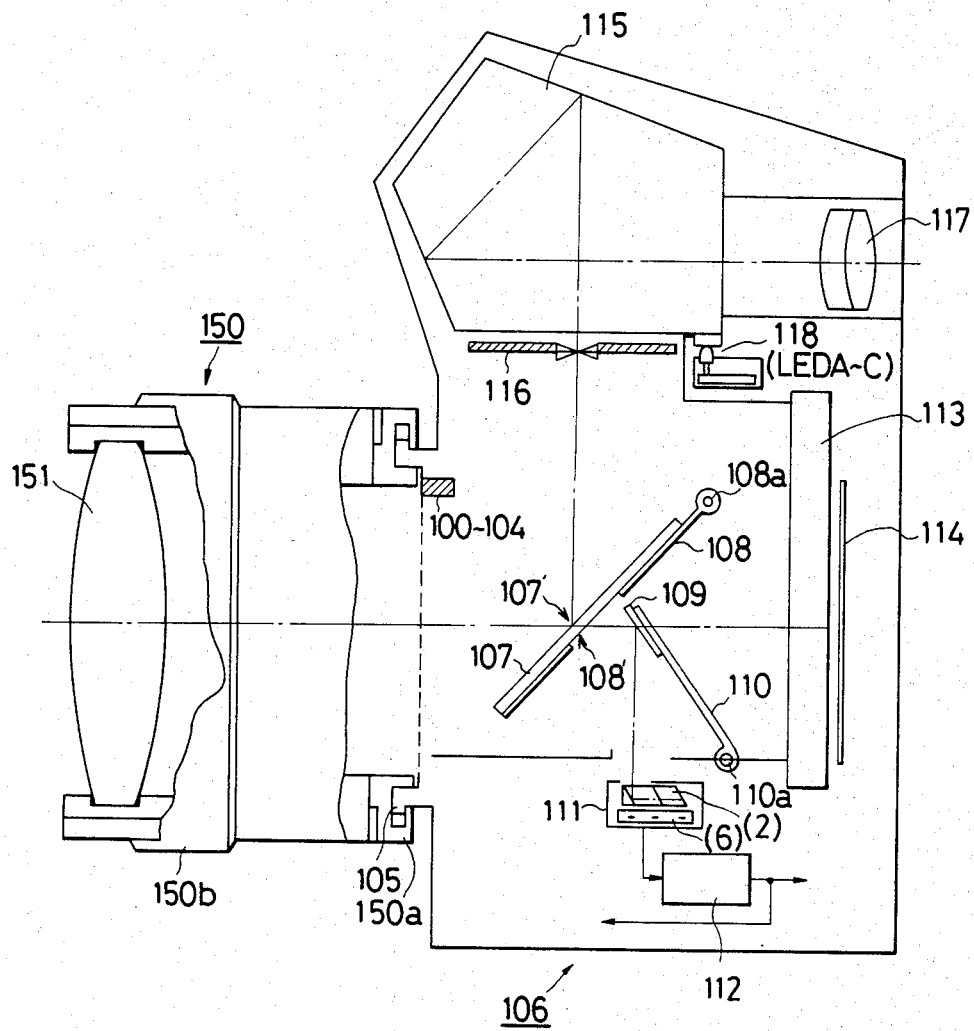
FIG. 10 is view showing a form of a single reflex camera system incorporating the focus detecting system according to the present invention.

FIG. 10 shows an example of a single reflex camera according to the present invention which uses the focus detecting system as described above. A photographic lens assembly 150 has a clamp ring 150a at the mounting part at the camera main body side for mounting the lens assembly, a focusing ring 150b for manually focusing a photographic optical system 151, and a mount (lens mount) of the photographic lens assembly 150 which is formed at part of the camera main body 106. A quick return mirror 107 of a known configuration is a semi-transparent mirror which has a suitable transmissivity at a part indicated by 107' or of the entirely. The quick return mirror 107 is supported by a support member 108 which pivots about a shaft 108a. The support member 108 has an opening 108' for allowing transmission of part of the incident light. A submirror 109 serves to downwardly deflect the transmitted light ray and is supported on a support member 110 pivotable about a shaft 110a. A light-receiving unit 111 houses in a housing the beam splitter 2 for focus detection and the light-receiving sections 6. The quick return mirror 107 and the submirror 109 are shifted from the optical path of the optical system by a known means in synchronism with the exposure initiated by the operation of the shutter release button (not shown). An electric unit 112 has the processing circuit described with reference to FIG. 2 for processing the image signal from the light-receiving unit 111 and a circuit for generating a display signal. The unit 111 and the electric unit 112 may be provided as a unitary section. The camera system further includes a known shutter 113, a film 114, a pentaprism 115, a focus plate 116, and an ocular lens 117. A display means 118 (including the light-emitting diodes LEDA to LEDC shown in FIG. 2) is arranged below the display means 115, so that the focusing state of the photographic optical system 151 may be visually confirmed at part of the range finder. The display means 118 is connected to the electric unit 112 through a lead wire (not shown).

Figure 11A:
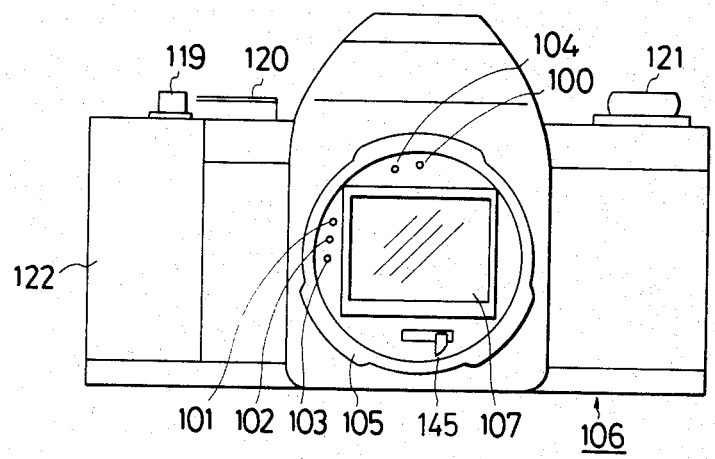
Figure 11B:
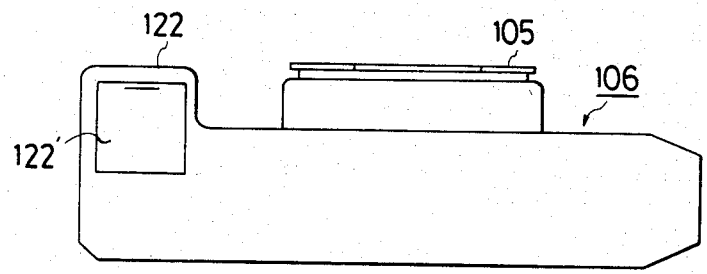

FIG. 11A shows a case wherein the electric contacts 100 to 104 shown in FIG. 2 are arranged in the vicinity of the lens mount 105 of the camera main body 106 which has the focus detecting means and the display means. The parts which function in the same manner as those in FIG. 10 are indicated by the same reference numerals. The camera system shown in this figure includes an operation button 119 for initializing the focus detection and shutter release, a winding lever 120, a film rewinding crank 121, and an aperture signal lever 145. FIG. 11B is a bottom view of the camera main body 106 which includes a hand grip 122 which also serves to store the cell E shown in FIG. 2. A lid 122' covers the hand grip 122.

Figure 12:
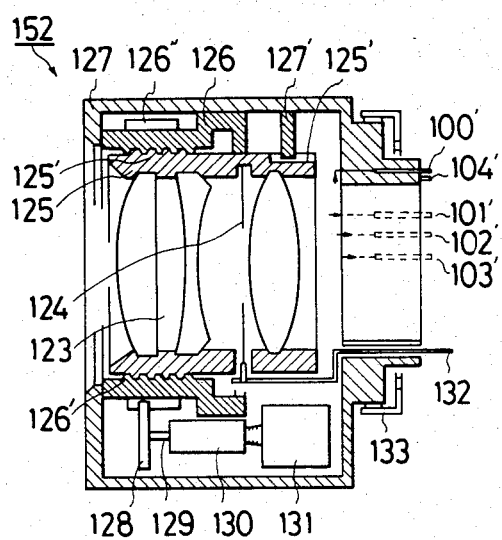
Figure 12:
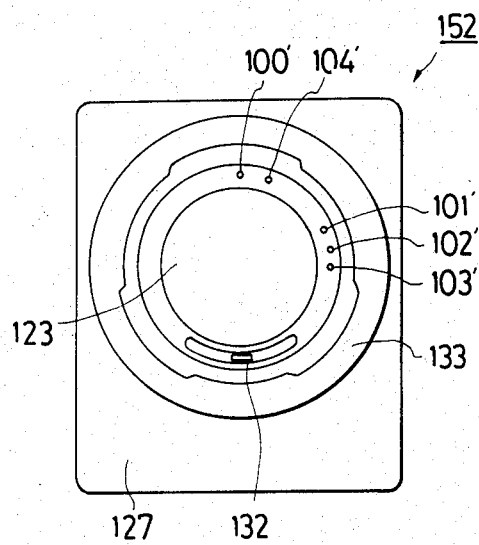

FIG. 12 shows one embodiment of the power focus lens assembly suitable for the camera main body shown in FIG. 11. A power focus lens assembly 152 includes a photographic lens system 123, an aperture 124, and a lens barrel 125 which holds the optical system 123 and the aperture 124 and which has at its part a helicoidal part 125'. A rotary lens barrel 126 has at its part a helicoidal part 126' which engages with the helicoidal part 125', and also has at part of its outer circumference a spur gear 126". The front end of a projection 127' formed at part of a housing 127 engages with a groove 125" formed in the lens barrel 125. The rotary lens barrel 126 is held to be rotatable about the optical axis of the optical system 123. The rotary lens barrel 126 rotates, as a fine pitch gear 128 engaged with the spur gear 126" is rotated through the shaft 129 by a motor 130. When the rotary lens barrel 126 rotates, due to the engagement of the helicoidal parts 125' and 126', the optical system 123 moves with the rotary lens barrel 125 along the direction of its optical axis with the aid of the rotation preventing action of the groove 125". A motor control circuit 131 controls the forward and backward rotation of the motor 130 to be described later. Signal lines of the motor control circuit 131 are connected to contacts 100' to 104' through suitable positions within the housing. When the lens assembly 152 is mounted to the camera main body 106 shown in FIG. 11, these signal lines are respectively connected to the contacts 100 to 104. An aperture signal pin 132 engages with the aperture signal lever 145 shown in FIG. 11. A clamp ring 133 at the lens assembly side is rotatably mounted at part of the housing 127, and it is engageable with a mount 105 of the camera main body. FIG. 12A is a rear view of the camera main body shown in FIG. 12A.

Figure 13:
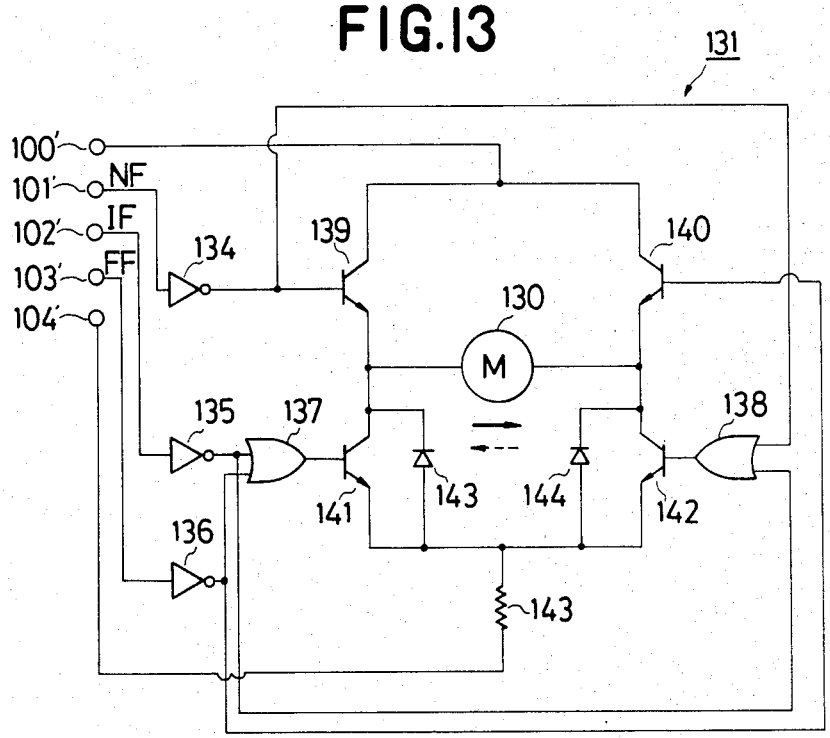
FIG. 13 is a partial circuit diagram showing an example of a motor control circuit incorporated in the power focus lens assembly shown in FIGS. 12A and 12B.

FIG. 13 shows the details of the motor control circuit 131 which also has the contacts 100' to 104' arranged at the side of the power focus lens assembly 152. Inverters 134, 135 and 136 are incorporated to invert the signals NF, IF and FF of negative logic values shown in FIG. 2 into positive logic values. Transistors 139 to 142 form a bridge circuit and the motor 130 is connected on the diagonal line thereof. OR gates 137 and 138 are connected to the bases of the transistors 141 and 142, and diodes 143 and 144 are connected to collectors thereof. A resistor 145 is included as a protective resistor. With the circuit of the configuration as described above, when the voltage is applied through the contacts 100' and 104' in the near-focus (NF), the contact 101' is at low level. Then, the output of the inverter 134 goes to high level and the transistors 139 and 142 are turned on. On the other hand, since the contacts 103' and 102' are at high level, the outputs of the inverters 135 and 136 are at low level, the output of the OR gate 137 is at low level, and the transistors 140 and 141 are turned off. Then, a current flows in the direction indicated by a solid line, the motor 130 rotates and the optical system 123 is displaced. The direction of rotation of the motor 130 and the direction of displacement of the optical system 123 are so related that the optical system 123 may be controlled to the focusing position. When the contact 102' goes to low level in the in-focus state (IF), the output of the inverter 135 goes to high level, the outputs of the OR gates 137 and 138 go to high level, and the transistors 141 and 142 are turned on. In this case, the contacts 101' and 103' are at high level, the outputs of the inverters 134 and 136 are at low level, and the transistors 139 and 140 are turned off. As a result, the motor 130 is short-circuited. Thus, since a reverse current flows through the transistor 141 and the diode 144 and through the transistor 142 and the diode 143 due to the rotation of the motor, the motor 130 immediately stops rotating.

In the far-focus state (FF), the contact 103' alone goes to low level, the output of the inverter 136 goes to high level, and the transistors 140 and 141 are turned on. Since the current flows through the motor 130 in the direction shown by arrow of the broken line, the optical system 123 is displaced in the direction opposite to the case of the near-focus state. In this manner, the motor 130 rotates in the forward direction or stops rotating according to the focusing state, accomplishing the automatic focusing.

In summary, according to the present invention, when the camera main body is coupled to the power focus lens assembly, the automatic focusing may be performed with simple operation, that is, the operation at the camera main body side. In addition, when the normal photographic lens assembly is used, the camera system may be used as a camera having focus indicator, the operation of which must be made manually but may be made sure.

What is claimed is:
1. A camera system comprising:
(A) a camera main body having:
(A-1) a section for mounting a photographic lens assembly,
(A-2) view finder means for viewing a field through a photographic optical system in said photographic lens assembly mounted to said mounting section,
(A-3) a focus detecting device for detecting a focusing state of said photographic optical system in said photographic lens assembly mounted to said mounting section, said focus detecting system generating an electric output signal representing the focusing state of said photographic optical system,
(A-4) displaying means for displaying the focusing state of said photographic optical system in said photographic lens assembly mounted to said mounting section in response to the output signal generated by said focus detecting device,
(A-5) contact means for transmitting the output signal generated by said focus detecting device to outside of said camera main body,
(A-6) a shutter device for photography,
(A-7) single manually operable means for both actuating said focus detecting device and releasing of said shutter device,
(A-8) a section which accommodates a power source for supplying power to said focus detecting device, and
(A-9) power source contact means for transmitting power from said power source accomodated in said accommodating section to outside of said camera main body; and

(B) photographic lens assemblies of first and second types selectively used with said camera main body, said photographic lens assemblies of first and second types respectively including,
  (B-1) mounting means for mounting said photographic lens assembly to said mounting section of said camera main body, and
  (B-2) a photographic optical system which can be focused,
  said photographic lens assembly of first type further comprising,
  (B-13) manually operable means for manually focusing said photographic optical system, and
  said photographic lens assembly of second type further comprising,
  an automatic focusing device for automatically focusing said photographic optical system based on the output signal from said focus detecting device of said camera main body,
  (B-24) contact means connectable to said contact means of said camera main body means, for transmitting the output signal from said focus detecting device of the camera main body to said automatic focusing device, and
  (B-25) power source contact means, which is connectable to said power source contact means of said main camera body, for supplying power from said power source accommodated in said accommodating section of said camera main body to said automatic focusing device.

2. A system according to claim 1, wherein said contact means of said camera main body is arranged in the vicinity of said mounting section, and said contact means of said photographic lens assembly of second type is arranged in the vicinity of said mounting means and at a position corresponding a position of said contact means of said camera main body so that said contact means is automatically electrically connected to said contact means of said camera main body when said photographic lens assembly is mounted to said mounting section of said camera main body.

3. A system according to claim 1, wherein said power source contact means of said camera main body is arranged in the vicinity of said mounting section, and said power source means of said photographic lens assembly of second type is arranged in the vicinity of said mounting means and at a position corresponding to a position of said power source contact means of said camera main body so that said power source contact means of said photographic lens assembly of second type is automatically electrically connected to said power source contact means of said camera main body.

4. A system according to claim 1 or 2, wherein said focus detecting device of said camera main body generates, as the output signal, signals representing an in-focus state, a near-focus state and a far-focus state of said photographic optical system in said photographic lens assembly mounted to said mounting means.

5. A system according to claim 4, wherein said focus detecting means further includes
  means for detecting an image formation state of images, formed by said photographic optical system in said photographic lens assembly mounted to said mounting section, at an imaging surface of said camera main body and three positions substantially corresponding thereto, and
  means for discriminating the focusing state of said optical system based upon the output signal from said focus detecting device, said discriminating means generating an electric signal representing the focusing state.

6. A camera main body according to claim 1 or 2, wherein said focus detecting device generates, as the output signal, signals representing an in-focus state, a near-focus state, and a far-focus state of said photographic optical system in said photographic lens assembly mounted to said mounting means.

7. A camera main body according to claim 4, wherein said focus detecting device further includes:
  means for detecting an image formation state of images, formed by said photographic optical system in said photographic lens assembly mounted to said mounting section, at an imaging surface of said camera main body and three positions substantially corresponding thereto, and
  means for discriminating the focusing state of said optical system based on the signal from said focus detecting means to generate an electric signal representing the focusing state.

8. A camera main body which may be commonly used with a photographic lens assembly having a photographic optical system which can be focused and an automatic focusing device for automatically focusing said optical system, and with a photographic lens assembly which does not have an automatic focusing device and which has means for manually focusing said optical system, comprising:
  (A-1) a section for mounting a photographic lens assembly,
  (A-2) view finder means for viewing a field through a photographic optical system in said photographic lens assembly mounted to said mounting section,
  (A-3) a focus detecting device for detecting a focusing state of said photographic optical system in said photographic lens assembly mounted to said mounting section, said focus detecting system generating an electric output signal representing the focusing state of said photographic optical system,
  (A-4) displaying means for displaying the focusing state of said photographic optical system in said photographic lens assembly mounted to said mounting section in response to the output signal generated by said focus detecting device,
  (A-5) contact means for transmitting the output signal generated by said focus detecting device to outside of said camera main body,
  (A-6) a shutter device for initiating photographing operation,
  (A-7) single manually operable means for both actuating said focus detecting device and releasing of said shutter device,
  (A-8) a section which accommodates a power source for supplying power to said focus detecting device, and
  (A-9) power source contact means for transmitting power of said power source accommodated in said accommodating section to outside of said camera main body.

9. A camera main body according to claim 8, wherein said contact means is arranged in the vicinity of said mounting section.

10. A camera main body according to claim 8, wherein said power source contact means is arranged in the vicinity of said mounting section.

11. A camera system comprising:

a camera body to be used with various detachably mounted lens assemblies, said camera body having an electric power source battery;

an auto-focusing lens assembly having a taking lens and a driving unit for receiving electric power from said battery provided in said camera body when said lens assembly is mounted on said camera body to drive said taking lens; and focus detection means, mounted in said camera body, for detecting an object image formed by said taking lens to perform focus detection.

12. A camera body for use with an auto-focusing lens assembly having driving means for driving a taking lens to an in-focus position and terminal means adopted to supply electric power to said driving means, said camera body comprising:

a power source unit; and terminal means adapted to be coupled with corresponding terminal means in the lens assembly when said lens assembly is mounted on said camera body, to supply electric power from said power source unit to the driving means in the auto-focusing lens assembly to drive the taking lens.

13. A camera body according to claim 12, wherein said power source unit is stored in the hand grip of the camera body.

14. A camera body according to claim 12, wherein said camera body further comprises focusing state detecting means for detecting the focusing state of an object image formed by the taking lens and a terminal for transmitting an output of said focusing state detecting means to said auto-focusing lens assembly when said auto-focusing lens assembly is mounted on said camera body.

15. A camera body according to claim 14, wherein said focusing state detecting means generates a signal for discriminating in-focus state, near-focus state and far-focus state of the taking lens provided in said auto-focusing lens assembly when said auto-focusing lens assembly is mounted on the camera body.

16. A camera body according to claim 12, wherein said terminal means in the camera body is disposed at a position where the terminal provided in said auto-focusing lens assembly can be connected to said terminal means provided in the camera body when said auto-focusing lens assembly is mounted on said camera body.

17. A camera body according to claim 14 or 15, wherein said terminal means is disposed at a position where the terminal provided in the auto-focusing lens assembly can be connected to said terminal means when said auto-focusing lens assembly is mounted on said camera body.

18. An auto-focusing lens assembly to be detachably mounted on a camera body having an electric power source unit for driving a taking lens therein and a terminal for supplying the electric power of said unit to the auto-focusing lens assembly, said lens assembly comprising:

a taking lens for forming an image of an object in a camera body when said auto-focusing lens assembly is mounted on the camera body;

driving means for driving said taking lens; and terminal means for receiving electric power from the power source unit provided in the camera body and for supplying the received electric power to said driving means when said auto-focusing lens assembly is mounted on the camera body.

19. An auto-focusing lens assembly according to claim 18, wherein said auto-focusing lens assembly further comprises a second terminal means for transmitting a signal supplied from the camera body to said driving means when said auto-focusing lens assembly is mounted on the camera body, said signal discriminating near-focus state, far-focus state and in-focus state of the taking lens.

20. An auto-focusing lens assembly according to claim 19, wherein said second terminal means is disposed at position where the terminal provided in the camera body can be connected to said second terminal means when said auto-focusing lens assembly mounted on the camera body.

21. An auto-focusing lens assembly according to claim 18, wherein said terminal means is disposed at a position where the terminal provided in the camera body can be connected to said terminal means provided in the auto-focusing lens assembly when said auto-focusing assembly is mounted on said camera body.

* * * * *